(12) United States Patent
Welch et al.

(10) Patent No.: US 6,976,664 B2
(45) Date of Patent: Dec. 20, 2005

(54) FREE FLOW VALVE AND ELEMENT

(75) Inventors: Steven D. Welch, Earleville, MD (US); Robert J. Elbich, Fogelsville, PA (US); Erik Zetterstrand, Palmerton, PA (US)

(73) Assignee: Mitos Technologies, Inc., Phoenixville, PA (US)

( * ) Notice: Subject to any disclaimer, the term of this patent is extended or adjusted under 35 U.S.C. 154(b) by 201 days.

(21) Appl. No.: 10/638,658

(22) Filed: Aug. 11, 2003

(65) Prior Publication Data

US 2005/0035317 A1    Feb. 17, 2005

(51) Int. Cl.[7] ............................................... F16K 7/04
(52) U.S. Cl. .................................................... 251/4
(58) Field of Search ................................. 251/4, 6–10

(56) References Cited

U.S. PATENT DOCUMENTS 3,285,563 A * 11/1966 Clarkson ..................... 251/8
3,350,053 A * 10/1967 Schmitz ...................... 251/5
4,877,053 A * 10/1989 Yusko et al. ............... 137/556
4,899,783 A *  2/1990 Yusko et al. ............... 137/556
5,992,818 A * 11/1999 Jones et al. .................. 251/7

* cited by examiner

Primary Examiner—David J. Walczak
Assistant Examiner—Huyen Le
(74) Attorney, Agent, or Firm—Werner & Axenfeld, LLP

(57) ABSTRACT

A gasketless, straight-through bore fluid flow pinch valve and flexible, removable tubing element for improved sanitary conditions in production facilities. The valve casing is joined by fittings that enable separation of the casing to remove and replace the flexible element, which includes all wetted surfaces. The fittings may be one or more hinges to permit partial separation of the valve casing, which permits the element to remain on-line while maintenance is performed on the valve. The flexible element is a silicone or PTFE-composite which is in an axially compressed state when locked into the valve by rigid, tolerance-fitted backup cups on the molded ends of the element, which increases the process life of the element.

17 Claims, 5 Drawing Sheets

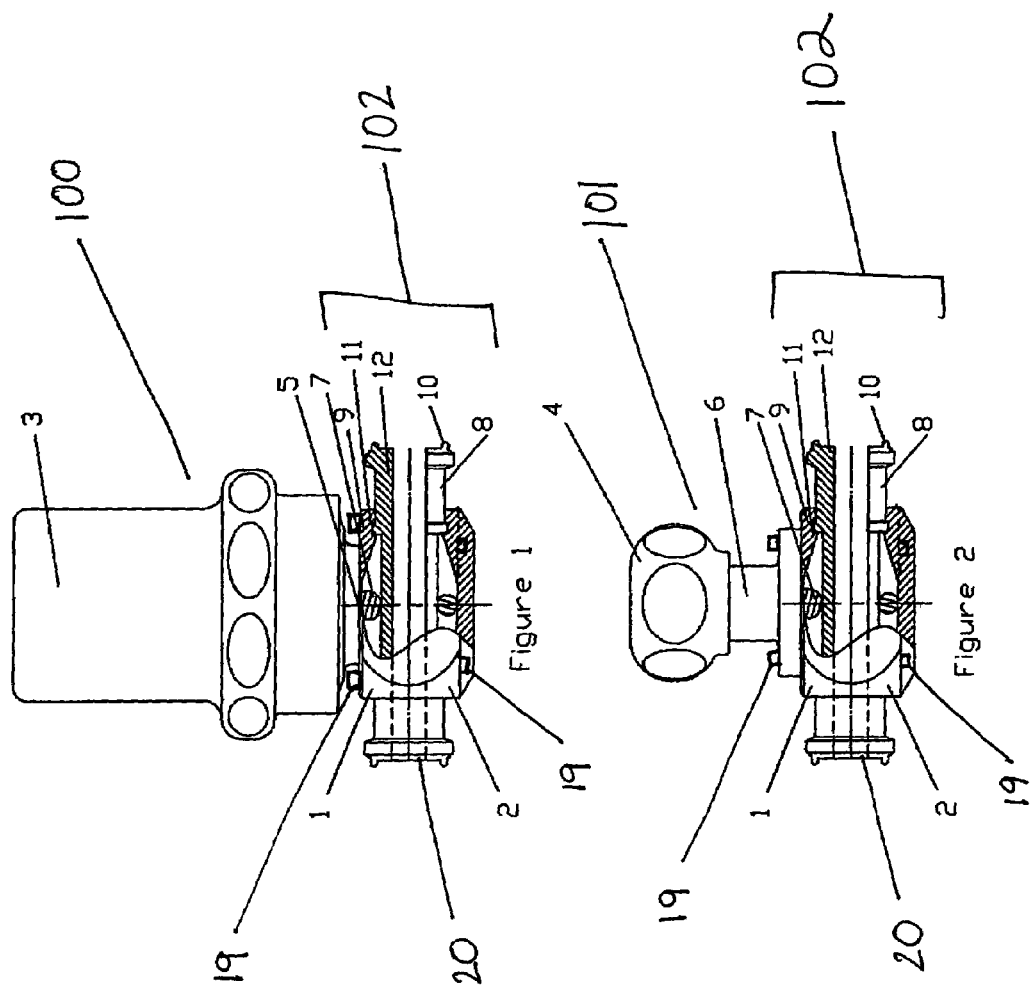

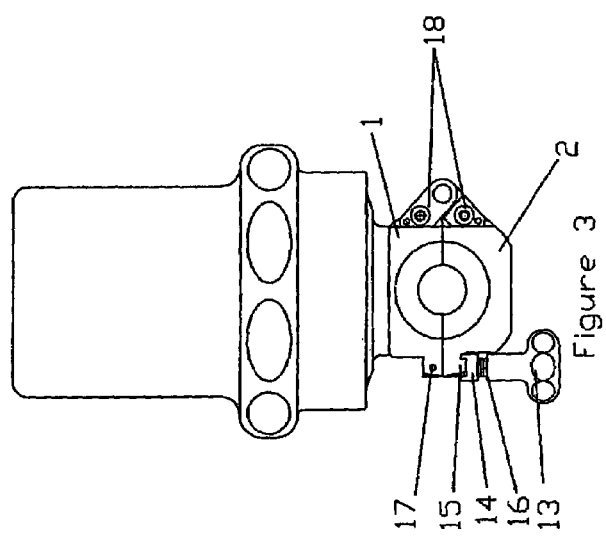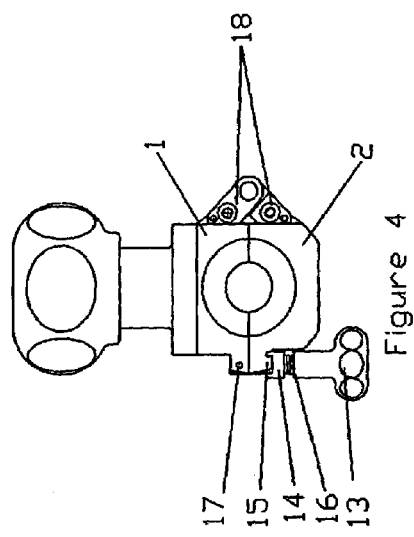

FREE FLOW VALVE AND ELEMENT

FIELD OF INVENTION

The present invention pertains to the field of fluid handling and positive shutoff-type flow valves. Specifically, the invention pertains to gasketless valves with smooth, non-contaminating straight-through bore fluid flow that are used in the sanitary field of pinch valves. More specifically, the invention pertains to pinch valves that incorporate a flexible, compressible tubing element to create a smooth, noncontaminating fluid flow so that all wetted surfaces (ie, surfaces making contact with fluid) are removable and replaceable.

BACKGROUND OF INVENTION

In many industries, such as the food industry, biological R&D, biological pilot plants and production facilities, the handling of fluid products requires an extremely sanitary environment. Equipment designed for product contact must create nonturbulent flow to safeguard products from damage as they travel through the valve. Ideally, a smooth, reliable passageway should be provided that is completely drainable to prevent any entrapment of the fluid material. It is also critical that valves in these industries be able to handle steam-in-place and clean-in-place techniques.

Currently, diaphragm valves are most prevalent in the above industries. Historically these valves have been viewed as sanitary and easy to clean. However, diaphragm valves maintain significant drawbacks in these areas that can be improved upon. For example, diaphragm valves have to be mounted in a specific configuration to permit drainage, which makes them installation sensitive. Second, the diaphragm in diaphragm valves creates a large sealing area which has potential to trap bacteria or leak. U.S. Pat. No. 4,800,920 to Yusko attempts to address the shortcomings of the diaphragm valve by using a pinch valve with an elastomeric sleeve. The Yusko valve, however, has a sleeve that is shorter than the length of the valve body requiring internal connection of the valve to fluid systems. Internal connection areas present the potential for entrapment of fluids and biological material.

An issue with pinch valves that concerns individuals in the aforementioned industries is the reliability of the tubing element or insert. Particularly, closing the valve places the insert tubing under tensile force (ie, repeated flexing or cycling) which wears the insert making it unsafe for use. Several attempts have been made to increase the life of the tubing element. For example, U.S. Pat. No. 3,350,053 to Schmitz describes some of the problems inherent to pinch valves used in the biopharmaceutical industry. In this patent, an attempt is made to increase the cycle life of the tubing element by using a preselected bulge molded into the insert between the end flanges. The sleeve is positioned in an unstretched, slack arrangement and a valve actuating member has a predetermined range of movement that takes up the slack molded into the sleeve. Thus, the sleeve experiences reduced, if any, tensile force as a result of actuator movement to a closed position.

An additional shortcoming of existing valves is their difficulty to be disassembled and cleaned. When the tubing element of a pinch valve or a diaphragm of a diaphragm valve is removed, areas that have been wetted must be cleaned, most often by hand. Hand cleaning results in decreased productivity and potential introduction of foreign agents into the valve and/or process stream.

Yusko's pinch valve features areas that must be cleaned when the tubing sleeve is removed—the parts of the valve that are wetted during operation. Taylor (U.S. Pat. No. 5,657,960) provides a pinch valve with internal gaskets that must be cleaned when the valve is opened and the element is replaced. Ensign's valve (U.S. Pat. No. 4,108,418) must be cleaned as parts are wetted during operation due to the flexible sleeve having a smaller axial length than the length of the valve, such that internal portions of the valve besides the element are wetted while in operation.

Another problem with existing pinch valves is that the flexible tubing element is not manufactured from a high-purity material. Current materials are often toxic elastomers manufactured in unsanitary environments, potentially contaminating products.

Finally, the standard connection type in the biopharmaceutical industry is a tri-clamp connection. The drawback of current tri-clamp designs is that a gasket is required between the valve and the connecting surface. This gasket can act as a bacteria trap, prevent drainage or even cause turbulence in the flow.

The subject of this invention contemplates a new and improved pinch valve arrangement that overcomes all of the above referenced problems of both current pinch valves and diaphragm valves and that provides an extremely reliable valve. While the invention most immediately pertains to the biopharmaceutical industry, it will be appreciated that the invention has broader applications and may be advantageously employed in other environments and applications.

SUMMARY OF INVENTION

The present invention provides an improved pinch valve arrangement particularly adapted for sanitary environments. This invention details a valve that consists of three primary parts: the body of the valve, which features a straight-through bore fitting a flexible sleeve (referred to here forward as "element"), with backup cups or crimped fittings, that has an axial length longer than that of the valve body; the top-works, which are used to depress or squeeze the tubing element; and the tubing element.

According to one aspect of the present invention, the top and bottom halves of the valve body can be separated to remove the flexible tubing element by detaching bolts, screws or other similar devices. Optionally, the top and bottom halves of the invention can be connected on one side by a hinge which enables the flexible tubing element to be removed without completely separating the two halves of the valve. Preferably, the two halves are connected on the non-hinged side by a single connection, such as a bolt, locking screw or other device that is operable without the use of tools, and which permits opening of the valve during operation without affecting the tubing insert. This allows the valve casing and topworks to be replaced without shutting down operation or compromising sterility.

There are three styles of topworks available on the present invention: manual, fail-close actuated and fail-open actuated. Fail-close actuators are designed to default to the closed position when no air is present. Fail-open actuators are designed to default to the open position when no air is present.

The valve element can be composed of a number of different materials. Each option is manufactured from one of the following high-purity materials: platinum-cured silicone, silicone polytetrafluorine (PTFE) composite, or fluoroelastomer and PTFE composite which are USP Class VI approved and manufactured in a clean environment. Each of these insert options is entirely crevice free due to molded tri-clamp ends with gaskets integrated into the molded tri-clamp face. The molded tri-clamp ends are fitted with specialized, tolerance-fitted backup cups that lock into grooves in the lower and upper halves of the valve body. According to one embodiment of the present invention, the tubing element can remain connected to the fluid system when the valve body is removed while the system is still in operation.

A principal advantage of the invention resides in the user's ability to remove the entire insert, which includes all wetted surfaces. Another advantage of the present invention is the integral nature of the gasket to the tri-clamp ends of the insert for materials, which eliminates the need for a gasket in the connection points. Further, extra length of the tubing insert reduces or eliminates tensile force during operation of the valve when the insert is axially compressed to fit the specialized backup cups into the grooves of the top and bottom halves of the valve.

BRIEF DESCRIPTION OF DRAWINGS

FIG. 1 provides a side view of a pneumatically-activated pinch valve according to the present invention.

FIG. 2 provides a side view of a manually-activated pinch valve according to the present invention.

FIG. 3 provides an end view of a pneumatically-activated hinged pinch valve according to the present invention.

FIG. 4 provides and end view of a manually-activated hinged pinch valve according to the present invention.

DETAILED DESCRIPTION OF THE INVENTION

Figure 5:
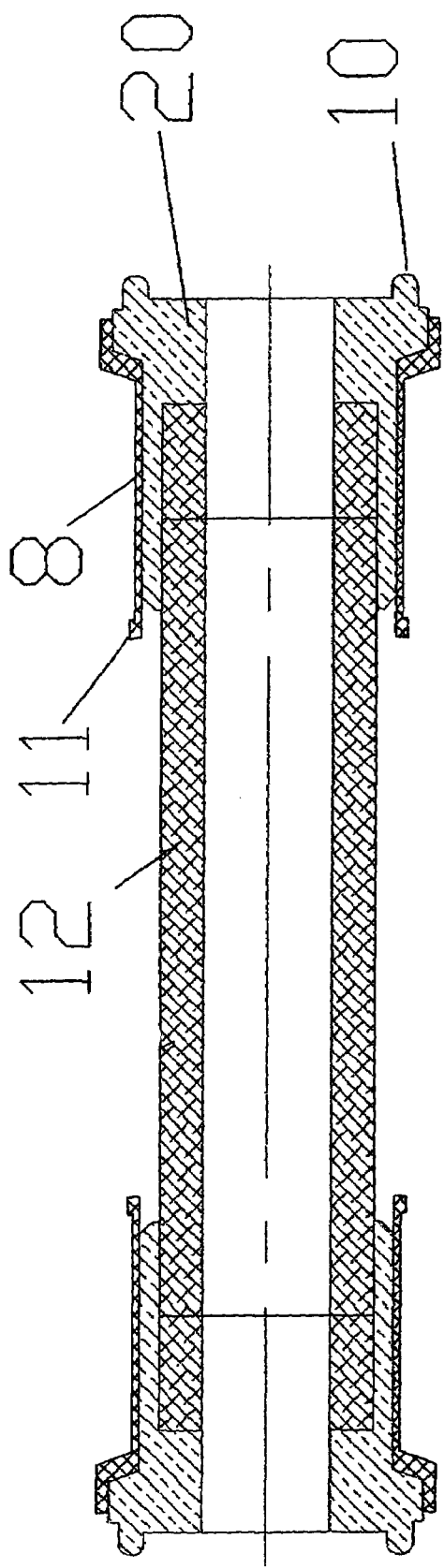
FIG. 5 illustrates a cross-section of one embodiment of the flexible element of the present invention.

Referring to the attached Figures, the present invention provides a novel straight-through bore flow axis valve and a silicone- or PTFE-composite removable tubing element. FIG. 1 illustrates the valve with a pneumatic actuator 100 that requires air pressure in order to operate the valve. FIG. 2 illustrates the valve with a manual actuator 101, which allows the valve to be operated by human hand. The top and bottom portions 1, 2 of the valve casing 102 are labeled respectively in FIGS. 1 & 2.

Referring to FIG. 2, the manual version of the valve prevents the element 12 from being overcompressed by having the topworks 4 bottom out on the manual stem 6 when the actuator 101 is fully engaged (ie, completely closed off). Referring back to FIG. 1, the pneumatically actuated version of the valve accomplishes the latter by having components in the pneumatic actuator 100 bottom out when the actuator 100 is fully engaged or closed. Overcompression of the element 12 is prevented in both valve actuator styles, thus increasing the life of the element 12. A single pinch bar 7 has a smooth radius to prevent cutting of the tubing during closing/pinching of the valve. The pinch bar 7 is operably connected to both pneumatic and manual actuator styles 100, 101 for closing said valve.

As illustrated in closer detail in FIG. 5, the removable element 12 is a flexible tube with an axial length longer than that of the valve body to permit axial compression of the element 12 when locked into place in the valve body. The element 12 is connected to external piping and/or equipment using sanitary connections that extend beyond the outside of both ends of the valve, eliminating internal connections. A tri-clamp end 20 is molded over the ends of the tubing element 12. The tri-clamp end 20 is composed of platinum-cured silicone and has a sanitary gasket 10 molded onto the face, making it fully integrated and crevice free. This allows the valve to be connected to the next piece of equipment without the use of separate gaskets, thus, eliminating potential entrapment areas that can promote the growth of bacteria. The removable element 12 is crevice free with no internal gaskets or flanges.

Referring back to FIGS. 1 and 2, specialized backup cups 8 are tolerance fitted onto the molded ends 20 of the tubing element 12 and lock into the upper and lower halves 1, 2 of the valve body via grooves 9 on the valve casing and protruding lip 11 on each backup cup 8. The backup cups 8 prevent movement of the element 12 within the valve during operation, which increases the life of the element 12. Stabilization of the element 12 and equipment connected to the valve is critical in processes in which the valve is permanently installed. FIG. 5 illustrates a cross-section of element 12 with the backup cups 8.

According to one embodiment of the present invention, FIGS. 1 and 2 illustrate that the element 12 is removable by loosening the bolts 19 on the lower half 2 of the valve casing, completely removing the top half 1 of the valve casing, removing the element 12, and placing a new one into the valve body by compressing the element 12 and locking the backup cups 8 into place via the grooves 9 in the valve body.

An alternative embodiment for element removal is illustrated in FIGS. 3 & 4. The top and bottom halves 1, 2 of the valve are connected by a hinge 18 on one side, which allows the element 12 to be accessed or replaced without having to completely separate the two halves 1, 2 of the valve casing. The valve is opened without the use of tools or equipment via a bolt or pivot pin 17 comprised, for example, of a threaded locking screw 13, 16 and movable saddle 14. The element 12 is removed by loosening the locking screw 13, 16 until the saddle 14 releases from the catch 15 on the valve body allowing the top half of the casing 1 to be hinged open. After the element 12 is replaced by compressing the tubing and locking in the backup cups 8, the locking screw 13, 16 of the pivot pin 17 is tightened until the saddle 14 catches and cannot be tightened further. Thus, the valve is reassembled in one simple step.

Figure 6:
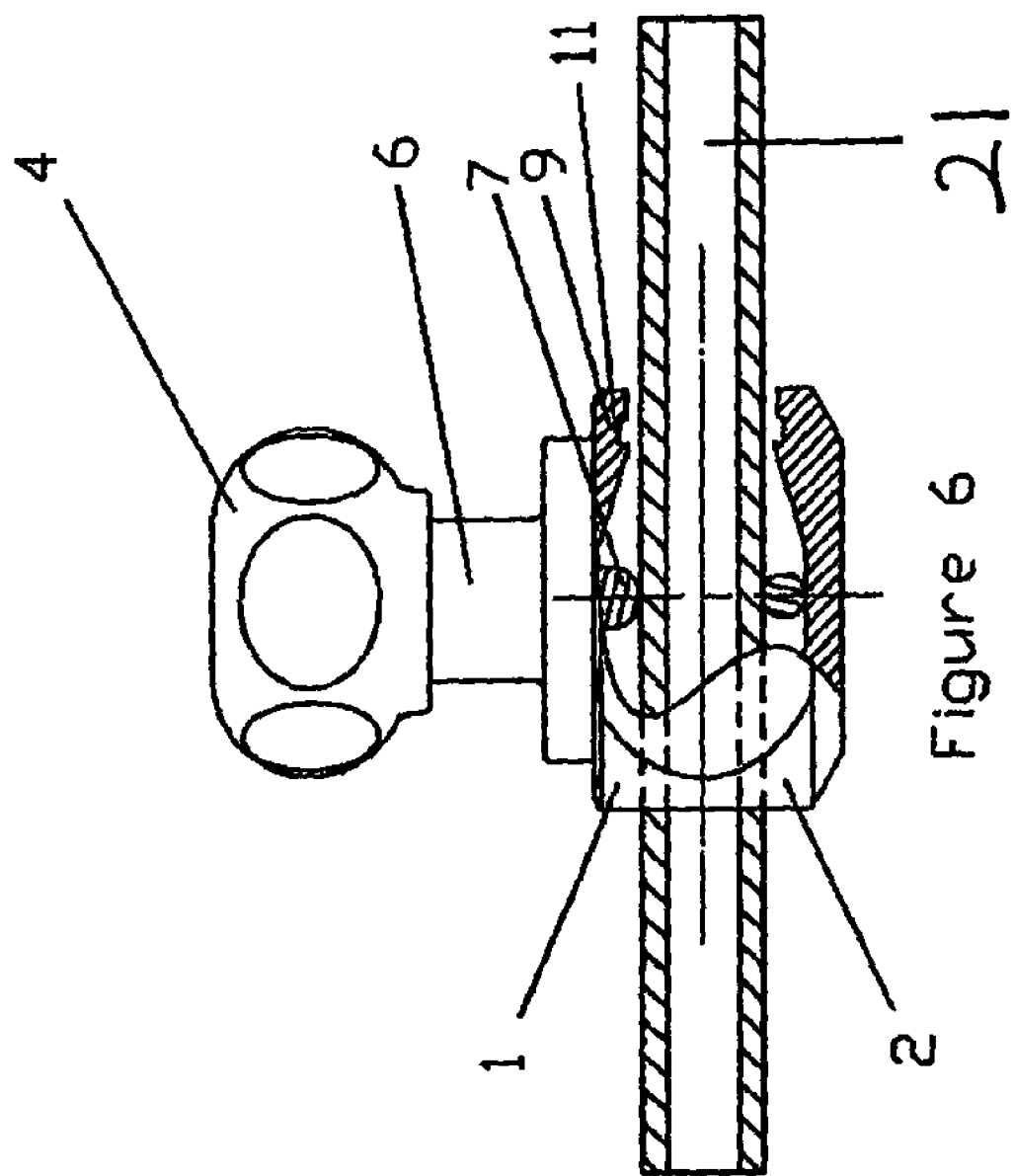
FIG. 6 illustrates a cross-section of a valve of the present invention attached to existing process tubing.

According to another embodiment of the present invention, as illustrated in FIG. 6, the valve is placed over existing process tubing 21, allowing the valve to be used without making modifications to the set-up of the existing fluid system.

The principal options for the materials of construction for the flexible tubing element 12 are 1) a composite of PTFE and silicone, 2) a composite of PTFE and a fluoroelastomer, and 3) platinum-cured silicone. Referring to FIG. 5, for example, all three materials are taken in bulk form and cut, with two backup cups 8 then placed onto the element 12. Next, liquid injection platinum-cured silicone is molded over each end of the silicone or PTFE/silicone tubing element; or a fluorelastomer material is molded over the PTFE fluoroelastomer tubing element. All elements are molded to a specific length based on the length of the valve body. Use of these materials in conjunction with the valve allow for clean-in-place and stem-in-place capabilities.

Figure 7:
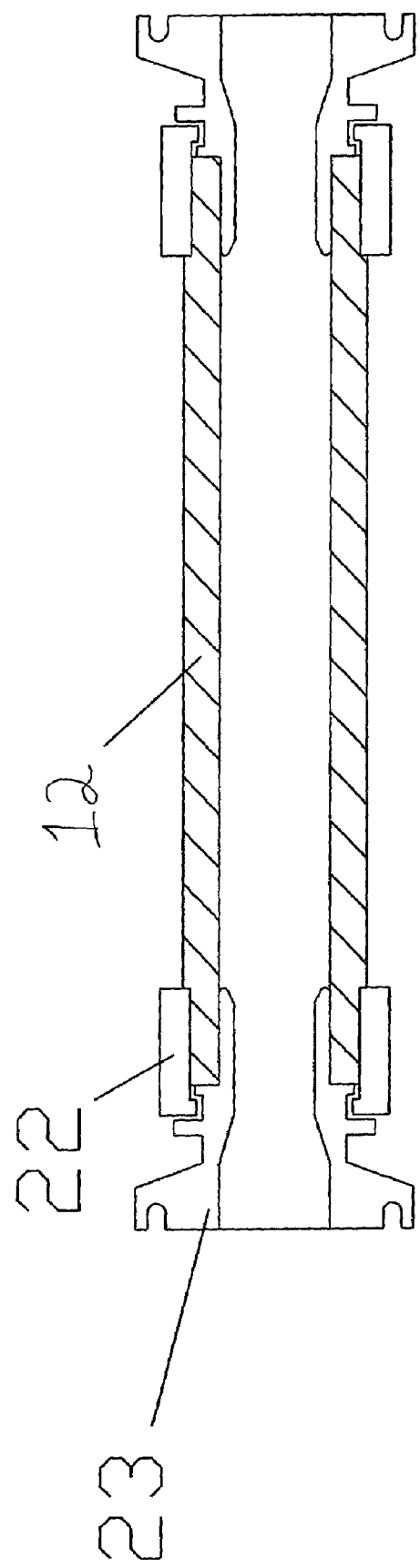
FIG. 7 illustrates a cross-section of one embodiment of the flexible element.

Another embodiment of the present invention's tubing element 12 is illustrated in FIG. 7. All three of the above tubing materials can be taken in bulk form, cut, and finished with a fitting 23 that is placed into the tubing element 12. The barbed end of the fitting 23 is placed inside the bore of the tubing element 12; the opposite end is machined to connection specifications. A crimp collar 22 is then swaged (i.e. crimped) on using a pneumatic crimping device to permanently connect the tubing element 12 to the fitting 23. Particular attention is paid to the radius of the barbs so that the tubing is not cut when swaged.

In all three of the above tubing element materials, the tubing, when formed into an element 12, is oversized slightly in length. When the valve is assembled, the element 12 is axially compressed from both ends towards the center to increase the thickness of the tubing material. This action removes tension from the element 12, prolonging the life of the element 12 by reducing the stress that arises from the valve closing.

The above description provides only an exemplary embodiment of the present invention for the purposes of illustration and not limitation. It will be readily apparent to those skilled in the art that the embodiment described herein may be modified or revised in various ways without departing from the spirit and scope of the invention. The scope of the invention is to be measured by the appended claims.

What is claimed is:

1. A single-piece construction valve comprising:
   a casing having an obstruction free straight-through bore flow axis and lock-in grooves;
   a removable, cylindrical flexible element for communicating fluid through said valve that fits into said casing, and has fixed tolerance-fitted rigid backup cups on each end of said element, wherein the length of said element is greater than the valve casing length, said element is compressed into said valve thereby removing tension from said element, and said element has a protruding lip that fits into and is removable from said lock-in grooves; and
   a manual or pneumatic actuator, whereby said actuator does not require fluid, wherein a piston operates a compressor bar in said actuator, and wherein the actuator possesses a mechanical stop to prevent over-compression of the flexible element when the actuator is fully engaged.

2. The valve of claim 1 wherein said element has molded-in end gaskets disposed at each end of said element for connection to adjacent sanitary piping or other equipment outside of said valve casing.

3. The valve of claim 2 wherein said casing is split longitudinally into top and bottom halves joined by a plurality of fittings, whereby said top or bottom half is removable while the element remains connected to said sanitary piping or other equipment.

4. The valve of claim 3 wherein said fittings comprise at least one screw, latch, bolt, hook, or hinge for connecting and assembling said top and bottom halves of said casing.

5. The valve of claim 3 wherein said casing is split longitudinally into top and bottom halves which are operably connected on one side of said casing with a hinge and on the opposite side of said casing with a connector for manually closing said top and bottom halves, whereby said valve casing is removable while said element remains connected to sanitary piping or other equipment.

6. The valve of claim 5 wherein said connector comprises at least one pivot pin connected to half of said casing on at least one protruding catch, said catch housing the pin when the valve casing is closed, wherein said at least one catch is split into two portions covering both the top and bottom halves of the valve casing, and whereby said pin is locked into place by a saddle that fits onto the opposite portion of said catch and locks the pin into place to close said valve.

7. The valve of claim 6 wherein said at least one pivot pin comprises a screw, bolt, nail, dowel, hook, or hinge that moves and secures the saddle into place when tightened.

8. The valve of claim 1 wherein said element is comprised of silicone or polytetrafluoroethylene composite materials.

9. A single-piece construction valve comprising:
   a horizontally-split casing having an obstruction free straight-through bore flow axis and lock-in grooves, the top and bottom halves of said horizontally-split casing joined by a plurality of fittings, and whereby said top or bottom half is removable while the other half remains connected to sanitary piping or other equipment;
   a removable, cylindrical flexible element for communicating fluid through said valve that fits into said casing and has fixed, rigid tolerance-fitted backup cups on each end of said element, each of said backup cups having a protruding lip that fits into and is removable from said lock-in grooves; and
   a manual or pneumatic actuator, whereby said actuator does not require fluid, wherein a piston operates a compressor bar in said actuator, and wherein the actuator possesses a mechanical stop to prevent over-compression of the flexible element when the actuator is fully engaged.

10. The valve of claim 9 wherein said fittings comprise at least one screw, latch, or bolt for manually closing said top and bottom halves.

11. The valve of claim 9 wherein said fittings comprise at least one hinge on one side and at least one pivot pin on the other side, said pin connected to half of said casing on at least one catch, said catch housing the pin when the valve casing is closed, wherein said at least one catch is split into two portions covering both the top and bottom halves of the valve casing, and whereby said pin is locked into place by a saddle that fits onto the opposite portion of said catch and locks the pin into place to close said valve.

12. The valve of claim 9 wherein the length of said element is greater than the valve casing length and the element is compressed into said valve thereby removing tension from the element.

13. A single-piece construction valve comprising:
   a horizontally-split casing having an obstruction free straight-through bore flow axis and lock-in grooves whereby said casing fits over existing and open tubing, the top and bottom halves of said horizontally-split casing are joined by a plurality of fittings, and whereby said top or bottom half is removable while the other casing half stays connected to sanitary piping or other equipment;
   a removable, cylindrical flexible element with a length greater than that of said valve casing for communicating fluid through said valve that fits into said casing and has fixed, rigid tolerance-fitted backup cups on each end of said element, each of said backup cups having a protruding lip that fits into and is removable from said lock-in grooves;
   a manual or pneumatic actuator, whereby said actuator does not require fluid, wherein a piston operates a compressor bar in said actuator, and wherein the actuator possesses a mechanical stop to prevent over-compression of the flexible element when the actuator is fully engaged.

14. The valve of claim 13 wherein said fittings comprise at least one screw, latch, bolt or hinge.

15. A flexible valve element comprising cylindrical tubing with molded-in gaskets disposed at each end of said element for connection to adjacent sanitary piping or other equipment outside of a valve casing and tolerance-fitted cylindrical rigid backup cups on each end of said element that lock into and are removable from the valve casing that is slightly shorter than the length of the element such that the element is axially compressed when locked into the valve casing.

16. The element of claim 15 wherein said element is comprised of a polytetrafluoroethylene/silicone composite, polytetrafluoroethylene/fluoroelastomer composite, or platinum-cured silicone in an entirely smooth-bore construction extending to sanitary piping or other equipment outside of said valve casing.

17. The element of claim 15 wherein said element can be detached from the valve casing to completely remove all wetted surface areas.

* * * * *